(12) United States Patent
Cao et al.

(10) Patent No.: US 11,927,379 B2
(45) Date of Patent: Mar. 12, 2024

(54) PRECOOLER-BASED TRANSCRITICAL $CO_2$ HEAT PUMP SYSTEM AND CONTROL METHOD OF WATERWAY TWO-WAY VALVE THEREOF

(71) Applicant: XI'AN JIAOTONG UNIVERSITY, Shaanxi (CN)

(72) Inventors: Feng Cao, Shaanxi (CN); Yulong Song, Shaanxi (CN); Xiang Yin, Shaanxi (CN); Mingjia Li, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 459 days.

(21) Appl. No.: 17/197,073

(22) Filed: Mar. 10, 2021

(65) Prior Publication Data
US 2021/0199362 A1   Jul. 1, 2021

Related U.S. Application Data

(63) Continuation of application No. PCT/CN2018/120174, filed on Dec. 11, 2018.

(30) Foreign Application Priority Data

Sep. 11, 2018 (CN) .......................... 201811058541.4

(51) Int. Cl.
*F25B 41/20* (2021.01)
*F25B 7/00* (2006.01)
(Continued)

(52) U.S. Cl.
CPC .............. *F25B 49/022* (2013.01); *F25B 7/00* (2013.01); *F25B 9/008* (2013.01); *F25B 30/02* (2013.01);
(Continued)

(58) Field of Classification Search
CPC .... F25F 7/00; F25F 39/00; F25F 47/02; F25F 2339/047; F25F 2347/02; F25F 2600/01
See application file for complete search history.

(56) References Cited

U.S. PATENT DOCUMENTS

2002/0000094 A1*   1/2002   Kuroki .................... F25B 41/24
                                                             62/197
2008/0168781 A1   7/2008   Yakumaru et al.

FOREIGN PATENT DOCUMENTS

CN       1227906 A       9/1999
CN       1381698 A       11/2002
(Continued)

OTHER PUBLICATIONS

Hu Bin, Cao Feng, Xing Ziwen, He Zhilong, "An Experimental Investigation on Hot Gas Defrost of Air-Source Transcritical CO2 Heat Pump Systems", Journal of Xi'an Jiaotong University, Mar. 2015, vol. 49, No. 3, pp. 74-79, DOI: 10.7652/xjtuxb201503013.

*Primary Examiner* — Jerry-Daryl Fletcher
*Assistant Examiner* — Daniel C Comings

(57) ABSTRACT

The present disclosures discloses a precooler-based transcritical $CO_2$ heat pump system and a control method of a waterway two-way valve thereof, in which a transcritical $CO_2$ heat pump system is assisted by a precooler system. A circulating waterway is divided into two parts in the system through a three-way diversion valve and a three-way confluence valve and is connected to a waterway bypass valve through a waterway two-way regulating valve. An ambient temperature sensor, an evaporation fin temperature sensor and an evaporation pressure sensor are provided, and a programmable logic controller is used as a core for acquisition, operation and control.

10 Claims, 2 Drawing Sheets

(51) Int. Cl.
 *F25B 9/00* (2006.01)
 *F25B 30/02* (2006.01)
 *F25B 39/00* (2006.01)
 *F25B 41/345* (2021.01)
 *F25B 47/02* (2006.01)
 *F25B 49/02* (2006.01)

(52) U.S. Cl.
 CPC .............. *F25B 39/00* (2013.01); *F25B 41/20* (2021.01); *F25B 41/345* (2021.01); *F25B 47/022* (2013.01); *F25B 2600/2501* (2013.01); *F25B 2600/2513* (2013.01); *F25B 2700/197* (2013.01); *F25B 2700/21172* (2013.01); *F25B 2700/21174* (2013.01); *F25B 2700/21175* (2013.01)

(56) References Cited

FOREIGN PATENT DOCUMENTS

| | | | |
|---|---|---|---|
| CN | 101957098 A | | 1/2011 |
| CN | 101957098 B | | 11/2011 |
| CN | 102563969 A | | 7/2012 |
| CN | 102564014 A | | 7/2012 |
| CN | 202452756 U | | 9/2012 |
| CN | 102767921 A | | 11/2012 |
| CN | 103363601 A | | 10/2013 |
| CN | 102767921 B | | 11/2014 |
| CN | 104949390 A | | 9/2015 |
| CN | 204830572 U | * | 12/2015 |
| CN | 204830572 U | | 12/2015 |
| CN | 105222385 A | | 1/2016 |
| CN | 105509125 A | | 4/2016 |
| CN | 106152344 A | | 11/2016 |
| CN | 106642808 A | | 5/2017 |
| CN | 206330196 U | | 7/2017 |
| CN | 107014098 A | | 8/2017 |
| CN | 107131680 A | | 9/2017 |
| CN | 105509125 B | | 6/2018 |
| CN | 108105833 A | | 6/2018 |
| CN | 108592452 A | | 9/2018 |
| JP | 2009236483 A | | 10/2009 |
| JP | 4862198 B2 | | 1/2012 |
| KR | 19990068037 A | | 8/1999 |
| KR | 100308093 B1 | | 9/2001 |
| KR | 100845554 B1 | | 7/2008 |
| KR | 20100034282 A | | 4/2010 |

* cited by examiner

PRECOOLER-BASED TRANSCRITICAL $CO_2$ HEAT PUMP SYSTEM AND CONTROL METHOD OF WATERWAY TWO-WAY VALVE THEREOF

CROSS-REFERENCE TO RELATED APPLICATION

The present application is a continuation of International Application No. PCT/CN2018/120174, filed on Dec. 11, 2018, which claims priority to Chinese patent application No. 201811058541.4, filed on Sep. 11, 2018, both of which are hereby incorporated by reference in their entireties.

TECHNICAL FIELD

The present disclosure belongs to the technical field of heating, ventilating, refrigerating and heat pumps, and relates to a transcritical $CO_2$ heat pump system.

BACKGROUND

In recent years, with the rapid development of the national economy, a large number of unhealthy energy supply methods and non-environmentally friendly technology development have caused increasingly serious environmental problems and energy crises, which have been the most serious problems faced by economic development prospects and negative effects carrying capacity which are a pair of eternal contradictions in China. Since a fundamental direction of the national economic development has gradually shifted from industry to tertiary industry and supporting industries for residents' living conditions in the last decade, energy output field under a background of industrial, commercial and civil use has also undergone a subtle change. According to reports, energy consumption of the HVAC industry under the background of industrial, commercial and civil use has now occupied the first place in the country's energy consumption, especially heating energy consumption.

Since in the traditional heating industry, distributed small coal-fired boilers, gas-fired boilers or electric boilers are often used as direct sources of heating energy, the low-efficiency and high-pollution characteristics of these boiler heating methods can be magnified nationwide, becoming one of the culprits of inefficient use of energy and primary environmental pollution. Therefore, in recent years, many scholars have invested in the use of heat pump systems in the heating field, among which a transcritical $CO_2$ heat pump system is the first. First of all, as a pure natural refrigerant from the atmospheric environment, $CO_2$ has unparalleled environmental friendliness and safety than other refrigerants, and its good low temperature fluidity is also very suitable for operation in cold regions in winter. In addition, under a supercritical working condition, $CO_2$ without a phase change process releases heat to the circulating water with a huge temperature slip in the gas cooler, so that the circulating water can be directly raised from a low-temperature condition to a high-temperature condition exceeding 80° C., which is very suitable for a temperature requirement in the heating sector. Therefore, combined with the transcritical $CO_2$ heat pump system's good low ambient temperature adaptability and high temperature of the outlet water capability, such heat pump system is very worthy of promotion and use in the heating field.

Of course, there are also some practical problems and technical difficulties in an actual application process of the transcritical $CO_2$ heat pump in the heating field. These difficulties may be mainly attributed to two points: a performance degradation of the transcritical $CO_2$ system due to high return water temperature and the particularity of the defrosting process of the transcritical $CO_2$ system. Since the return water temperature of a water circulation system (i.e. temperature of the inlet water of a heat pump system) is generally higher than 40° C. in the application background of the heating field, if such medium-temperature water is directly introduced into a gas cooler of a transcritical $CO_2$ heat pump system to exchange heat with $CO_2$ gas, the temperature of the cooled $CO_2$ gas is high, the heat supply potential of the system is difficult to be fully reflected, and an operation efficiency of the system is low. On the other hand, due to a high exhaust pressure of the transcritical $CO_2$ system, there are few four-way reversing valves on the market that meet the pressure requirements. Therefore, the heat pump system cannot defrost through the four-way reversing valve as a common refrigerant heat pump system used in the heating field. Instead, hot air from an exhaust port is discharged into an evaporator after temperature and pressure reduction, which results in that the temperature of the defrosting fluid in the evaporator itself is not high enough and the defrosting time is longer than that of conventional refrigerant systems. Because the heat pump system cannot carry out conventional heat supply in the defrosting process, a longer defrosting time inevitably causes a great reduction of the average water temperature in the waterway circulation system, and brings a fluctuation of the temperature of a heating water source. On the other hand, due to the longer defrosting time, a unit control system is required to have more precise logic for determining whether to defrost or not, in such a manner that the unit enters a defrosting process when the frost is really serious and returns to a normal heating process in time after the defrosting is completed.

In summary, the existing transcritical $CO_2$ heat pump system faces three main technical problems in the actual application of the heating field: high temperature return water directly entering the $CO_2$ gas cooler will reduce the system efficiency; judgment conditions and control logic of entry and exit of defrost should be more accurate and rigorous; and a temperature fluctuation of a circulating water system should be avoided as much as possible during a long defrost process.

SUMMARY

The present disclosure aims to provide a precooler-based transcritical $CO_2$ heat pump system and a control method of waterway two-way valve thereof, so as to solve practical problems and technical difficulties in a process of popularizing and using a transcritical $CO_2$ heat pump technology to industrial, commercial and civil use heating fields. The precooler-based transcritical $CO_2$ heat pump system according to the present disclosure may automatically switch between a normal heating mode and a defrosting mode according to environmental conditions and the state of a unit, and may supply heat uninterruptedly within defrosting time. The transcritical $CO_2$ heat pump system according to the present disclosure may automatically monitor and switch heating and defrosting modes according to a sensor equipped by the system, and continuously supply heat in a defrosting process, so that high efficiency and safety of the equipment in an operation process are ensured, and a stability and reliability of the overall water temperature of a waterway system are ensured.

In order to achieve the purpose, the present disclosure adopts following technical scheme.

A precooler-based transcritical $CO_2$ heat pump system includes a circulating waterway system, a $CO_2$ heat pump system and a precooler system.

The circulating waterway system includes a system water inlet, a three-way diversion valve, a waterway two-way regulating valve, a three-way confluence valve and a system water outlet.

The $CO_2$ heat pump system includes a $CO_2$ compressor, a $CO_2$ gas cooler, an electronic expansion valve, a defrosting solenoid valve and a $CO_2$ evaporator.

The precooler system includes a precooling system compressor, a precooling system condenser, a thermal expansion valve and a precooling system evaporator.

In the circulating waterway system, the system water inlet is connected to an inlet of the three-way diversion valve, and system inlet water is divided into two parts through the three-way diversion valve: a first outlet of the three-way diversion valve is connected to a first inlet of the precooling system condenser and then connected to a first inlet of the three-way confluence valve; a second outlet of the three-way diversion valve is connected to a first inlet of the precooling system evaporator, then is connected to a first inlet of the $CO_2$ gas cooler of the $CO_2$ heat pump system, then is connected to the waterway two-way regulating valve, and then is connected to a second inlet of the three-way confluence valve; and an outlet of the three-way confluence valve is connected to the system water outlet.

An outlet of the precooling system compressor in the precooler system is connected to a second inlet of the precooling system condenser, a second outlet of the precooling system condenser is connected to an inlet of the thermal expansion valve, an outlet of the thermal expansion valve is connected to a second inlet of the precooling system evaporator, and a second outlet of the precooling system evaporator is connected to an inlet of the precooling system compressor, in such a manner that a circulation loop is formed.

An outlet of the $CO_2$ compressor in the $CO_2$ heat pump system is connected to a second inlet of the $CO_2$ gas cooler, a second outlet of the $CO_2$ gas cooler is connected to an inlet of the electronic expansion valve, an outlet of the electronic expansion valve is connected to an inlet of the $CO_2$ evaporator, and an outlet of the $CO_2$ evaporator is connected to an inlet of the $CO_2$ compressor; and a refrigerant pipeline of an outlet of the $CO_2$ gas cooler is also short-circuited to the inlet of the $CO_2$ evaporator through the defrosting solenoid valve.

Further, the precooler-based transcritical $CO_2$ heat pump system also includes an ambient temperature sensor, an evaporation fin temperature sensor and an evaporation pressure sensor. The ambient temperature sensor is configured to sense a temperature of inlet air of the $CO_2$ evaporator of the $CO_2$ heat pump system. The evaporation fin temperature sensor is configured to sense a temperature of fins of the $CO_2$ evaporator. The evaporation pressure sensor is configured to sense a pressure of refrigerant in the $CO_2$ evaporator. These measuring signals are transmitted into a programmable logic controller (PLC). The PLC controls starting and stopping or opening degree adjustment of the precooling system compressor (21), the $CO_2$ compressor (11), the electronic expansion valve (13), the waterway two-way regulating valve (4), the defrosting solenoid valve (14) and a waterway bypass valve (3) through electronic signals.

Further, a waterway system between the precooling system evaporator of the precooler system and the $CO_2$ gas cooler of the $CO_2$ heat pump system is short-circuited to a waterway pipeline downstream the precooling system condenser through the waterway bypass valve.

A control method of waterway two-way valve of a precooler-based transcritical $CO_2$ heat pump system includes the following steps.

During a normal heating process, the waterway bypass valve is closed, and the waterway two-way regulating valve is opened. the system inlet water is divided into two parts through the three-way diversion valve. A first part of the system inlet water is heated after flowing through the precooling system condenser, and flows through the three-way confluence valve to the water outlet. A second part of the system inlet water is cooled by the precooling system evaporator first, then enters the $CO_2$ gas cooler of the $CO_2$ heat pump system to be heated again, and flows through the three-way confluence valve and converges with a first circulating water and is supplied to the water outlet.

Further, during normal heating, the waterway two-way regulating valve automatically regulates its opening degree through an adaptive fuzzy PID controller; the adaptive fuzzy PID controller takes a temperature difference $\Delta T$ between inlet water and outlet water of the $CO_2$ gas cooler and a change rate $d\Delta T/dt$ of the temperature difference as input, and utilizes a fuzzy control rule to modify PID parameters on line so as to meet a requirement of self-tuning the PID parameters; and the PID parameters are fuzzy self-tuned to find a fuzzy relation among parameters $k_P$, $k_I$, $k_D$ and $\Delta T$, $d\Delta T/dt$ of PID.

During normal heating, the opening degree $d(t_k)$ of the waterway two-way regulating valve is calculated according to the following formula:

$$d(t_k) = C_1 k_P \Delta T(t_k) + C_2 k_I \sum_{i=0}^{k} \Delta T(t_i) + C_3 k_D [\Delta T(t_k) - \Delta T(t_{k-1})]$$

where k denotes a number of operations. Taking into account that a control precision of a two-way valve is 160, that is, a value of a system output analog quantity changes within a range of 4 MA-20 MA, the minimum change range is 0.1 MA, the minimum change range is 0.1 MA, then the maximum value of K is 160 to meet the accuracy requirements. $\Delta T$ denotes the temperature difference between the outlet water and refrigerant of the $CO_2$ gas cooler. C1-C3 denote weight coefficients. In the PID adjustment process, the weight coefficients are corrected according to a change of the external water temperature and a target value, and the weight coefficient changes stepwise. According to the difference between the measured water temperature and the target water temperature, the weight coefficients change from the initial value (1,0.5,0.25) to (1,1,1) in steps. The purpose is to reach a setting water temperature faster. $k_P$, $k_I$ and $k_D$ denote the PID parameters. The PID parameter segmented control and self-tuning need to find a functional relation between PID parameters $k_P$, $k_I$, $k_D$, and $T_{air}$, water temperature. According to the function relation, the parameters may be modified online through continuous inspection of $T_{air}$ and water temperature, etc., to meet control requirements under different working conditions, so as to ensure that system heating and energy efficiency COP have better dynamic and static performance. In this controller, in order to ensure that the variables can be better covered, ranges of input and output are set as follows: $k_P$ is [−100,100], $k_I$ is [−20, 20], and $k_D$ is [−1,1].

Further, a degree of frosting of the $CO_2$ heat pump system is accurately assessed based on measurement values of the ambient temperature sensor, the evaporation fin temperature sensor, and the evaporation pressure sensor. It is determined that the $CO_2$ evaporator of the $CO_2$ heat pump system has been sufficiently frosted as long as following three conditions are all met, and a defrosting mode is entered to defrost. The following three conditions lie in that: a. a frosting time of a unit is greater than a setting time; b. a measured ambient temperature is lower than a defrosting ambient temperature setting value; and c. a temperature difference between the measured ambient temperature and a measured temperature of evaporation fins is greater than a defrosting temperature difference setting value.

When defrost starts, the opening degree of the electronic expansion valve reaches the maximum, the defrosting solenoid valve is opened, the waterway two-way regulating valve is closed, a fan of the $CO_2$ evaporator is closed. High-temperature and high-pressure gas of the outlet of the $CO_2$ compressor is guaranteed to flow through the $CO_2$ gas cooler, the two parallel electronic expansion valves and the defrosting solenoid valve for throttling and pressure reduction, and then enter the $CO_2$ evaporator, and fully exchange heat with a frost layer in the $CO_2$ evaporator, so as to achieve defrosting as soon as possible.

Further, when defrost starts, the waterway bypass valve is opened in such a manner that a second circulating water flows through the precooling system evaporator is bypassed to the three-way confluence valve through the waterway bypass valve and eventually flows out from the system water outlet to be supplied to a user.

Further, a defrosting effect of the $CO_2$ heat pump system is accurately assessed based on the measurement values of the ambient temperature sensor, the evaporation fin temperature sensor, and the evaporation pressure sensor. It is determined that a frost layer on the $CO_2$ evaporator has been eliminated as long as one of following three conditions is met, the defrosting mode is exited, and a normal heating process is restarted. The following three conditions lie in that: a. a temperature of evaporation fins of a unit exceeds a setting defrosting ending temperature; b. an evaporation pressure of the unit exceeds a setting defrosting ending pressure; and c. an accumulated defrosting time of the unit reaches a maximum setting defrosting time.

Simultaneously, when the defrosting mode exits, the opening degree of the electronic expansion valve is returned to a memory value of a last normal operation, the defrosting solenoid valve is closed, the opening degree of the waterway two-way regulating valve is returned to the memory value of the last normal operation, and the fan of the $CO_2$ evaporator is opened to a memory rotating speed of the last normal operation, in such a manner that an effective pressure difference is established as soon as possible in the system, and the system is recovered to a normal heating state.

Further, the temperature difference between the ambient temperature and the temperature of the evaporation fins in the defrosting mode is calculated as follows:

$$T_{diff} = 12 + \frac{1}{5}T_{air}$$

where $T_{diff}$ (° C.) is the temperature difference; $T_{air}$ (° C.) is the ambient temperature.

The maximum setting defrosting time in a condition of exiting the defrosting mode is calculated as follows:

$$t_{df,max} = 15 + \frac{1}{2}\text{abs}(T_{air})$$

where $t_{df,max}$ (° C.) is the maximum setting defrosting time, $T_{air}$ (° C.) is the ambient temperature, and $\text{abs}(T_{air})$ is an absolute value of the ambient temperature.

An exhaust pressure during defrosting is set as:

$$\begin{cases} P_d = \frac{9}{4}P_s + \frac{1}{10}\text{abs}(T_{air}) \\ P_{d,max} = 11 \end{cases}$$

where $P_d$ (MPa) is the exhaust pressure during defrosting; $P_{d,max}$ (MPa) OHO is an upper limit of the exhaust pressure during defrosting, and; $P_s$ (MPa) is a suction pressure during defrosting.

Setting values of other judgment parameters other than the above are provided with corresponding fixed empirical reference values according to climatic conditions of an application site and results of the preliminary pretest. Specifically, a frost accumulation setting time for entering a defrosting condition is 60 min, and a defrosting ambient temperature setting value is 0° C.; a setting defrosting ending temperature of exiting the defrosting condition is 7° C., and a setting defrosting ending pressure is 3.8 MPa.

Compared with the related art, the present disclosure has the following advantages.

The present disclosure properly and effectively reduces a temperature of the inlet water of the gas cooler of the transcritical $CO_2$ heat pump system by attaching an additional precooler system to the transcritical $CO_2$ heat pump system, so that the heat production capacity, the energy efficiency and the potential of ultra-high temperature water outlet of the transcritical $CO_2$ heat pump system are ensured to be exerted, a problem of inadaptability to the higher water inlet temperature when the transcritical $CO_2$ heat pump is applied to the heating field is solved, and a performance exertion of the transcritical $CO_2$ heat pump system in the heating field is basically ensured.

The present disclosure properly designs a control method for the transcritical $CO_2$ heat pump system circularly entering and exiting the defrosting process, in such a manner that the unit may automatically judge a frost layer accumulation condition or a defrosting condition on the evaporator of the transcritical $CO_2$ heat pump system, thereby accurately and quickly switch between a normal operation mode and a defrosting mode, while ensuring that the unit stably and efficiently operates in the ultra-long-span operation period of a heating season. There is a stable temperature difference between the ambient temperature and the temperature of the evaporation fins in a normal operation state. An accumulation of the frost layer may influence a heat exchange effect, so that the temperature difference is increased. In view of this, the present disclosure can easily judge a thickness of the frost layer by measuring the temperature difference, and thus is very simple and effective. Further, through an auxiliary effect of a setting value of ambient temperature and a setting value of accumulated frosting time, it is ensured that the unit may indeed run for a long time under lower ambient temperature, and may enter the defrosting process only when external conditions of frosting are met, so that a rigidness of an automatic judgment of a defrosting logic of the unit is ensured while prevent the unit from entering the defrosting mode due to a misoperation of a certain sensor or influence of abnormal weather conditions, which would otherwise influence normal heat supply of the system. In addition, considering that temperature of the frost layer is lower than 0° C., the present disclosure indirectly judges the defrosting effect by detecting the temperature of the evaporation fins, in such a manner that when the temperature of the evaporation fins is kept stable, the evaporation fins are proved to exchange heat with the frost layer with constant temperature. Once the temperature of the evaporation fins breaks through a stable value and starts to rise, it is proved that the frost layer has been basically removed and cannot absorb the heat of defrosting hot gas. Meanwhile, since the temperature and pressure of the refrigerant correspond to each other in the two-phase region, the present disclosure also uses the evaporation pressure as an assistant, and exits the defrosting process when the evaporation pressure is detected to gradually rise over a certain setting value, so as to achieve mutual protection and avoid an accidental fault phenomenon of a single sensor. Meanwhile, the present disclosure may set the longest defrosting time, so as to ensure that the unit will not always remain in the defrosting mode even when both sensors fail.

The present disclosure skillfully utilizes the precooler system to make up for the defect that a heating capacity of the transcritical $CO_2$ system is suspended in the defrosting process. By arranging the waterway bypass valve, when the transcritical $CO_2$ system enters the defrosting mode and stops heating, flow of a whole waterway cycle does not need to be cut off, and meanwhile, constant heating can be carried out by the precooler system. Even if the heat supply of the precooler system is limited, the average temperature of the water circulation system may still be ensured not to drop greatly in the short defrosting time of the $CO_2$ system.

DESCRIPTION OF EMBODIMENTS

Figure 1:
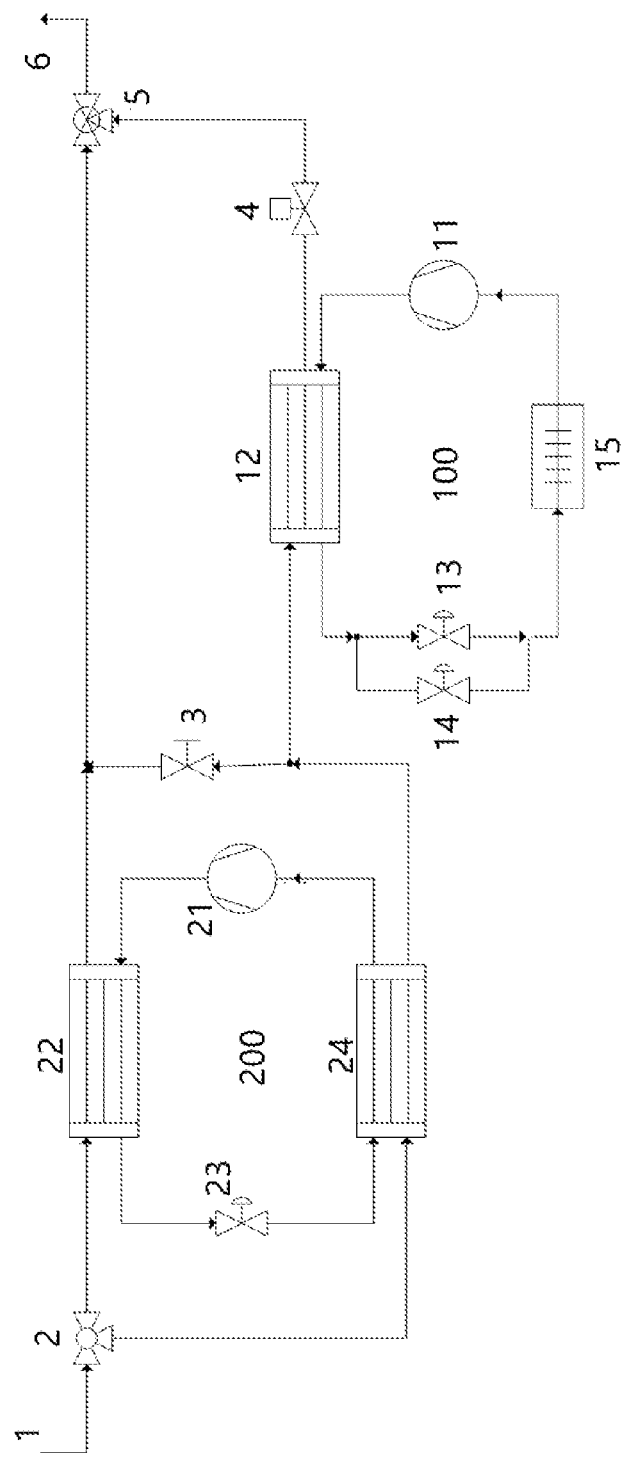
FIG. 1 is a schematic diagram of a precooler-based transcritical $CO_2$ heat pump according to the present disclosure.

Referring to FIG. 1, a precooler-based transcritical $CO_2$ heat pump system of the present disclosure includes a circulating waterway system, a $CO_2$ heat pump system 100 and a precooler system 200.

The circulating waterway system includes a system water inlet 1, a three-way diversion valve 2, a waterway bypass valve 3, a waterway two-way regulating valve 4, a three-way confluence valve 5 and a system water outlet 6.

The $CO_2$ heat pump system includes a $CO_2$ compressor 11, a $CO_2$ gas cooler 12, an electronic expansion valve 13, a defrosting solenoid valve 14, a $CO_2$ evaporator 15, an ambient temperature sensor, an evaporation pressure sensor and an evaporation fin temperature sensor.

The precooler system includes a precooling system compressor 21, a precooling system condenser 22, a thermal expansion valve 23 and a precooling system evaporator 24.

In the present disclosure, all the acquired signals and the control logic are uniformly acquired and executed by a programmable logic controller PLC.

In the circulation waterway system, the system water inlet 1 is connected to an inlet of the three-way diversion valve 2, and system inlet water is divided into two parts through the three-way diversion valve 2: a first outlet of the three-way diversion valve is connected to a first inlet of the precooling system condenser 22 and then is connected to a first inlet of the three-way confluence valve 5; a second outlet of the three-way diversion valve is connected to a first inlet of the precooling system evaporator 24, then connected to a first inlet of the $CO_2$ gas cooler 12 of the $CO_2$ heat pump system, then connected to the waterway two-way regulating valve 4, and then connected to a second inlet of the three-way confluence valve 5. An outlet of the three-way confluence valve 5 is connected to the system water outlet 6.

Meanwhile, a waterway system between the precooling system evaporator 24 of the precooling system and the $CO_2$ gas cooler 12 of the $CO_2$ heat pump system is short-circuited to a waterway pipeline downstream the precooling system condenser 22 through the waterway bypass valve 3. An outlet of the precooling system compressor 21 in the precooler system is connected to a second inlet of the precooling system condenser 22, a second outlet of the precooling system condenser 22 is connected to an inlet of the thermal expansion valve 23, an outlet of the thermal expansion valve 23 is connected to a second inlet of the precooling system evaporator 24, and a second outlet of the precooling system evaporator 24 is connected to an inlet of the precooling system compressor 21, so as to form a circulation loop.

An outlet of the $CO_2$ compressor 11 in the $CO_2$ heat pump system is connected to a second inlet of the $CO_2$ gas cooler 12, a second outlet of the $CO_2$ gas cooler 12 is connected to an inlet of the electronic expansion valve 13, an outlet of the electronic expansion valve 13 is connected to an inlet of the $CO_2$ evaporator 15, and an outlet of the $CO_2$ evaporator 15 is connected to an inlet of the $CO_2$ compressor 11. At the same time, a refrigerant pipeline of an outlet of the $CO_2$ gas cooler 12 is also short-circuited to the inlet of the $CO_2$ evaporator 15 through the defrosting solenoid valve 14.

The present disclosure relates to a precooler-based transcritical $CO_2$ heat pump system, which is also provided with two temperature sensors and one evaporation pressure sensor. The two temperature sensors include an ambient temperature sensor and an evaporation fin temperature sensor. The ambient temperature sensor is configured to sense an ambient temperature of the system operation, that is, a temperature of inlet air of the $CO_2$ evaporator 15 of the $CO_2$ heat pump system. The evaporation fin temperature sensor is configured to sense a temperature of fins of the $CO_2$ evaporator 15, that is, an evaporation temperature of the $CO_2$. The evaporation pressure sensor is configured to sense a refrigerant pressure in the $CO_2$ evaporator 15, that is, an evaporation pressure of $CO_2$. These measurement signals are transmitted into a programmable logic controller PLC for unified processing and operation. Based on results of the processing and operation, the programmable logic controller PLC also outputs a control signal to control starting and stopping or opening degree adjustment of each adjustable actuator (e.g., the precooling system compressor 21, the $CO_2$ compressor 11, the electronic expansion valve 13, the waterway two-way regulating valve 4, the defrosting solenoid valve 14, the waterway bypass valve 3, etc.) in the system.

In the foregoing, a control method of waterway two-way valve of a precooler-based transcritical $CO_2$ heat pump system according to the present disclosure includes the followings steps.

Referring to FIG. 1, during a normal heating process, the waterway bypass valve 3 is closed, and the waterway two-way regulating valve 4 is opened, and system inlet water of a high temperature is divided into two parts through the three-way diversion valve 2. A first part of the system inlet water is heated to a higher temperature after flowing through the precooling system condenser 22, and flows through the three-way confluence valve 5 to the system water outlet 6. A second part of the system inlet water is cooled by the precooling system evaporator 24 first, then enters the $CO_2$ gas cooler 12 of the $CO_2$ heat pump system at a low temperature and then is heated to a higher temperature again, and flows through the three-way confluence valve 5 and converges with a first circulating water and is supplied to the water outlet 6. Because the process ensures that the temperature of the inlet water of the transcritical $CO_2$ heat pump system is low enough, a heating capacity, a better circulation efficiency and a strong ultrahigh-temperature outlet water potential of the transcritical $CO_2$ heat pump system are also reflected.

Further, because different operating conditions (e.g. the ambient temperature, circulating water flow, the temperature of the inlet water, etc.) have an influence on an overall heating capacity of the system, in order to ensure that temperature of outlet water of the system keeps a relatively stable condition, the opening degree of the waterway two-way regulating valve 4 may be automatically regulated according to the temperature of the outlet water during normal heating, so as to achieve an effect of regulating the temperature of the outlet water. Because the precooling system is in a subcritical cycle, an exhaust pressure of the precooling system and a power of the compressor may be influenced by the water flow in a heat exchanger and a heat exchange effect of the heat exchanger. Moreover, the $CO_2$ system is a transcritical cycle, and the exhaust pressure and the power of the compressor are hardly influenced by the water flow in the heat exchanger and the heat exchange effect of the heat exchanger. So, the waterway two-way regulating valve 4 is only installed on a waterway of the $CO_2$ heat pump cycle, rather than on a total waterway. Therefore, the present disclosure makes more effective use of a unique performance that the pressure and temperature of the transcritical $CO_2$ heat pump cycle do not correspond to each other when the heat is being released in the supercritical zone, controls an integral higher temperature of the outlet water without additional compressor power, and further embodies an energy-saving effect.

Figure 2:
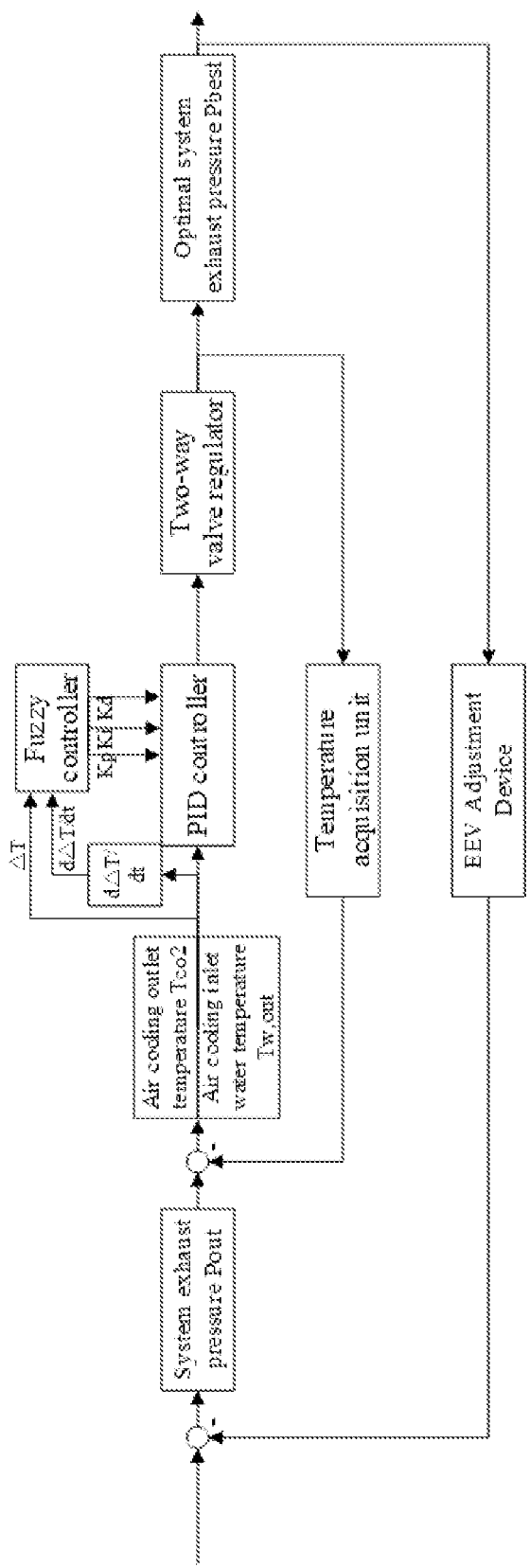
FIG. 2 is a logic block diagram of an adaptive fuzzy PID controller.

Referring to FIG. 2, during normal heating, the waterway two-way regulating valve 4 automatically regulates the opening degree through an adaptive fuzzy PID controller. Since the flow of the waterway is inseparable from the exhaust pressure of the $CO_2$ cycle, the adaptive fuzzy PID controller is involved in controlling an optimal exhaust pressure of the $CO_2$ heat pump system at the same time. A parameter setting of the PID control system has great influence on a final responsiveness of the system, and a stable operation of the system may be ensured only by proper parameters. The parameters are generally set by adopting an online setting method, but a refrigeration system has a characteristics of large lag and multiple time-varying in response to different operating conditions, and a fuzzy controller is introduced as the online setting method of the PID parameters in order to meet a requirement of accurate control. The adaptive fuzzy PID controller takes a temperature difference $\Delta T$ between inlet water and outlet water of the $CO_2$ gas cooler 12 and a change rate $d\Delta T/dt$ of the temperature difference as input, and utilizes a fuzzy control rule to modify PID parameters on line so as to meet the requirement of self-tuning the PID parameters. The PID parameters is fuzzy self-tuned to find a fuzzy relation among parameters $k_P$, $k_I$, $k_D$ and $\Delta T$, $d\Delta T/dt$ of PID. According to the fuzzy control rule, the parameters may be modified online by constantly checking $\Delta T$ and $d\Delta T/dt$, in such a manner that control requirements under different working conditions and current states are met, so that a system heating capacity and a system exhaust pressure have better dynamic and static performances.

In the present disclosure, the temperature difference between the temperature of the outlet water of the $CO_2$ gas cooler 12 and the refrigerant temperature and a rate of change the temperature difference are input values of the fuzzy controller. The opening degree of the waterway two-way regulating valve 4 is calculated by the following formula during normal heat supply:

$$d(t) = C_1 k_P \Delta T(t) + C_2 k_I \int \Delta T(t) d(t) + C_3 k_D \frac{d\Delta T(t)}{dt}$$

where d(t) denotes the opening degree of the waterway two-way regulating valve 4, $\Delta T$ denotes the temperature difference between the outlet water of the $CO_2$ gas cooler 12 and the refrigerant, $d\Delta T(t)/dt$ denotes the rate of change of the temperature difference, C1-C3 denote reference coefficients, and $k_P$, $k_I$ and $k_D$ denote PID parameters.

Considering a delay of the system heat exchange, in practical application, the PID is controlled by a difference method, that is, an actual opening degree of the waterway two-way regulating valve 4 of the waterway is:

$$d(t_k) = C_1 k_P \Delta T(t_k) + C_2 k_I \sum_{i=0}^{k} \Delta T(t_i) + C_3 k_D [\Delta T(t_k) - \Delta T(t_{k-1})]$$

k denotes a number of operations. Taking into account that a control precision of a two-way valve is 160, that is, a value of a system output analog quantity changes within a range of 4 MA-20 MA, the minimum change range is 0.1 MA, the minimum change range is 0.1 MA, then the maximum value of K is 160 to meet the accuracy requirements. A T denotes the temperature difference between the outlet water and refrigerant of the $CO_2$ gas cooler. C1-C3 denote weight coefficients. In the PID adjustment process, the weight coefficients are corrected according to a change of the external water temperature and a target value, and the weight coefficient changes stepwise. According to the difference between the measured water temperature and the target water temperature, the weight coefficients change from the initial value (1,0.5,0.25) to (1,1,1) in steps. The purpose is to reach a setting water temperature faster. $k_P$, $k_I$ and $k_D$ denote the PID parameters. The PID parameter segmented control and self-tuning need to find a functional relation between PID parameters $k_P$, $k_I$, $k_D$, $T_{air}$, and water temperature. According to the function relation, the parameters may be modified online through continuous inspection of $T_{air}$ and water temperature, etc., to meet control requirements under different working conditions, so as to ensure that system heating and energy efficiency COP have better dynamic and static performance. In this controller, in order to ensure that the variables can be better covered, set a range of input and output as: $k_P$ is $[-100,100]$, $k_I$ is $[-20, 20]$, and $k_D$ is $[-1,1]$.

Referring to FIG. 1, according to measurement values of the ambient temperature sensor, the evaporation fin temperature sensor, and the evaporation pressure sensor, a control method of waterway two-way valve of the precooler-based transcritical $CO_2$ heat pump system according to the present disclosure may accurately assess a degree of frosting of the CO$_2$ heat pump system, and it is determined that the CO$_2$ evaporator of the CO$_2$ heat pump system is sufficiently frosted as long as following three conditions are all met, and a defrosting mode is entered to defrost. The three conditions include: a. a frosting time of a unit is greater than a setting time. During the operation of the unit, if the measured ambient temperature is lower than the setting value of a frostable ambient temperature, the frosting time of the unit will begin to accumulate. In principle, the frosting time is equal to a normal heating operation time of the unit. When the unit stops normal heating due to shutdown, power failure or malfunction, the frosting time is not cleared, and the frosting time will only be cleared due to defrosting. The three conditions further include: b. a measured ambient temperature is lower than a defrosting ambient temperature setting value; and c. a temperature difference between the measured ambient temperature and a measured temperature of evaporation fins is greater than a defrosting temperature difference setting value.

When defrost starts, the opening degree of the electronic expansion valve 13 reaches the maximum, the defrosting solenoid valve 14 is opened, the waterway two-way regulating valve 4 is closed, a fan of the CO$_2$ evaporator 15 is closed, high-temperature and high-pressure gas of the outlet of the CO$_2$ compressor 11 is guaranteed to flow through the CO$_2$ gas cooler 12 (no heat exchange occurs because this section of the waterway has been closed), and the two parallel valves for throttling and pressure reduction, and then enter the CO$_2$ evaporator 15 with a higher temperature, and fully exchange heat with a frost layer in the CO$_2$ evaporator 15, so as to achieve defrosting as soon as possible.

Further, according to measurement values of the ambient temperature sensor, the evaporation fin temperature sensor, and the evaporation pressure sensor, the control method of waterway two-way valve of the precooler-based transcritical CO$_2$ heat pump system according to the present disclosure may accurately assess a defrosting effect of the CO$_2$ heat pump system, and it is determined that the frost layer on the CO$_2$ evaporator has been eliminated as long as one of following three conditions are met, the defrosting mode is exited, and a normal heating process is restarted. The following three conditions lie in that: a. the temperature of the evaporation fins of the unit exceeds a setting defrosting ending temperature; b. an evaporation pressure of the unit exceeds a setting defrosting ending pressure; and c. an accumulated defrosting time of the unit reaches a maximum setting defrosting time. The accumulated defrosting time will not be reset due to the shutdown, power failure or malfunction of the unit.

When the defrosting mode exits, the opening degree of the electronic expansion valve 13 is returned to a memory value of a last normal operation, the defrosting solenoid valve 14 is closed, the opening degree of the waterway two-way regulating valve 4 is returned to the memory value of the last normal operation, and the fan of the CO$_2$ evaporator 15 is opened to a memory rotating speed of the last normal operation, in such a manner that an effective pressure difference is established as soon as possible in the system, and the system is recovered to a normal heating state.

Referring to FIG. 1, in the control method of waterway two-way valve of the precooler-based transcritical CO$_2$ heat pump system according to the present disclosure, all the above-mentioned temperature, pressure, and time setting values will be affected by climatic conditions and environmental conditions of an application site, and thus these setting values are not constant. Specifically, the temperature difference between the ambient temperature and the temperature of the evaporation fins in the defrosting mode is calculated as follows:

$$T_{diff} = 12 + \frac{1}{5} T_{air}$$

where $T_{diff}$ (° C.) is the temperature difference; and $T_{air}$ (° C.) is the ambient temperature.

Further, the maximum defrosting setting time (i.e., an upper limit of defrosting time) in a condition of exiting the defrosting mode is calculated as follows:

$$t_{df,max} = 15 + \frac{1}{2}\text{abs}(T_{air})$$

where $t_{df,max}$ (° C.) is the maximum setting defrosting time, and $T_{air}$ (° C.) is the ambient temperature.

Further, the exhaust pressure during defrosting is set as:

$$\begin{cases} P_d = \frac{9}{4}P_s + \frac{1}{10}\text{abs}(T_{air}) \\ P_{d,max} = 11 \end{cases}$$

where $P_d$ (MPa) is the exhaust pressure during defrosting; $P_{d,max}$ (MPa) is the upper limit of the exhaust pressure during defrosting, $P_s$ (MPa) is a suction pressure during defrosting, $T_{air}$ (° C.) is the ambient temperature, and abs($T_{air}$) is an absolute value of the ambient temperature.

The setting values of other judgment parameters other than the above are given corresponding fixed empirical reference values according to the climatic conditions of the application site and the results of the preliminary pretest. Specifically, a frost accumulation setting time for entering a defrosting condition is recommended as 60 min, and a defrosting ambient temperature setting value is recommended as 0° C.; the setting defrosting ending temperature of exiting the defrosting condition is recommended as 7° C., and the setting defrosting ending pressure is recommended as 3.8 MPa.

Referring to FIG. 1, in the control method of waterway two-way valve of the precooler-based transcritical CO$_2$ heat pump system according to the present disclosure, when defrosting starts, the waterway bypass valve is opened, and the second circulating water flowing through the precooler evaporator is bypassed to the three-way confluence valve through the waterway bypass valve and finally flows out of the system water outlet to be supplied to a user. In this way, it may be ensured that, during the cyclic defrosting process of the CO$_2$ heat pump, the system still provides a part of heat from the precooler system which is always in uninterrupted operation, and the average temperature of the water circulation system is prevented from greatly dropping due to a stop of heat supply during the cyclic defrosting process of the CO$_2$ heat pump.

In conclusion, the control method of waterway two-way valve of the precooler-based transcritical CO$_2$ heat pump system according to the present disclosure solves three main problems of the application of the transcritical CO$_2$ heat pump in the heating field. Firstly, the additional precooler circulation system effectively reduces the water temperature entering the gas cooler of the transcritical CO$_2$ system, ensuring that the transcritical CO$_2$ system heat generation, energy efficiency and the potential of ultra-high outlet water temperature. Secondly, a method for automatically judging the thickness of the frost layer of the unit is properly established by skillfully utilizing the positive correlation between the temperature difference effect of the ambient temperature and the temperature of the evaporation fins and the accumulation of the frost layer, a false operation is prevented by accumulating frost accumulation time and limiting the frost accumulation ambient temperature, a progress of the defrosting process is reflected by utilizing the evaporation pressure or the temperature of the evaporation fins, sensor faults are prevented by limiting defrosting time, the unit may be strictly and accurately judged to defrost only when the frost accumulation is serious, and the unit quits defrosting when defrosting is basically completed, so that a stable heat supply of the unit is ensured to the maximum extent, the unit may not enter defrosting due to false operation of factors such as disturbance and the like, the operation reliability of the unit is ensured, and the unit may not be damaged due to serious frost accumulation. Thirdly, the heating capacity of the precooler system is skillfully utilized, so that the unit still has stable and considerable heating capacity when the heating of the transcritical $CO_2$ system is stopped in the defrosting process, a rapid drop of the average temperature of the waterway circulation system is prevented, and a stability of the heating system is maintained.

What is claimed is:

1. A precooler-based transcritical $CO_2$ heat pump system, comprising: a circulating waterway system, a $CO_2$ heat pump system and a precooler system;

wherein the circulating waterway system comprises: a system water inlet (1), a three-way diversion valve (2), a waterway two-way regulating valve (4), a three-way confluence valve (5) and a system water outlet (6);

the $CO_2$ heat pump system comprises: a $CO_2$ compressor (11), a $CO_2$ gas cooler (12), an electronic expansion valve (13), a defrosting solenoid valve (14) and a $CO_2$ evaporator (15);

the precooler system comprises: a precooling system compressor (21), a precooling system condenser (22), a thermal expansion valve (23) and a precooling system evaporator (24);

in the circulating waterway system, the system water inlet (1) is connected to an inlet of the three-way diversion valve (2), and system inlet water is divided into two parts through the three-way diversion valve (2): a first outlet of the three-way diversion valve is connected to a first inlet of the precooling system condenser (22) and then connected to a first inlet of the three-way confluence valve (5); a second outlet of the three-way diversion valve is connected to a first inlet of the precooling system evaporator (24), then connected to a first inlet of the $CO_2$ gas cooler (12) of the $CO_2$ heat pump system, then connected to the waterway two-way regulating valve (4), and then connected to a second inlet of the three-way confluence valve (5); and an outlet of the three-way confluence valve (5) is connected to the system water outlet (6); an outlet of the precooling system compressor (21) in the precooler system is connected to a second inlet of the precooling system condenser (22), a second outlet of the precooling system condenser (22) is connected to an inlet of the thermal expansion valve (23), an outlet of the thermal expansion valve (23) is connected to a second inlet of the precooling system evaporator (24), and a second outlet of the precooling system evaporator (24) is connected to an inlet of the precooling system compressor (21), in such a manner that a circulation loop is formed;

an outlet of the $CO_2$ compressor (11) in the $CO_2$ heat pump system is connected to a second inlet of the $CO_2$ gas cooler (12), a second outlet of the $CO_2$ gas cooler (12) is connected to an inlet of the electronic expansion valve (13), an outlet of the electronic expansion valve (13) is connected to an inlet of the $CO_2$ evaporator (15), and an outlet of the $CO_2$ evaporator (15) is connected to an inlet of the $CO_2$ compressor (11); and a refrigerant pipeline of an outlet of the $CO_2$ gas cooler (12) is also short-circuited to the inlet of the $CO_2$ evaporator (15) through the defrosting solenoid valve (14).

2. The precooler-based transcritical $CO_2$ heat pump system of claim 1, further comprising: an ambient temperature sensor, an evaporation fin temperature sensor and an evaporation pressure sensor; wherein the ambient temperature sensor is configured to sense a temperature of inlet air of the $CO_2$ evaporator (15) of the $CO_2$ heat pump system; the evaporation fin temperature sensor is configured to sense a temperature of fins of the $CO_2$ evaporator (15); the evaporation pressure sensor is configured to sense a pressure of refrigerant in the $CO_2$ evaporator (15); signals sensed by the ambient temperature sensor, the evaporation fin temperature sensor and the evaporation pressure sensor are transmitted into a programmable logic controller (PLC); the PLC controls starting or stopping of the precooling system compressor (21), the $CO_2$ compressor (11), the defrosting solenoid valve (14) and a waterway bypass valve (3) through electronic signals, and controls opening degree adjustment of the electronic expansion valve (13) and the waterway two-way regulating valve (4) through electronic signals.

3. The precooler-based transcritical $CO_2$ heat pump system of claim 1, wherein a waterway system between the precooling system evaporator (24) of the precooler system and the $CO_2$ gas cooler (12) of the $CO_2$ heat pump system is short-circuited to a waterway pipeline downstream the precooling system condenser (22) through a waterway bypass valve (3).

4. A control method of a waterway two-way valve of the precooler-based transcritical $CO_2$ heat pump system of claim 1, comprising:

during a normal heating process, closing a waterway bypass valve (3), and opening the waterway two-way regulating valve (4), the system inlet water being divided into two parts through the three-way diversion valve (2); a first part of the system inlet water being heated after flowing through the precooling system condenser (22), and flowing through the three-way confluence valve (5) to the water outlet (6); a second part of the system inlet water being cooled by the precooling system evaporator (24) first, then entering the $CO_2$ gas cooler (12) of the $CO_2$ heat pump system to be heated again, and flowing through the three-way confluence valve (5) and converging with a first circulating water and being supplied to the water outlet (6).

5. The control method of claim 4, wherein during normal heating, the waterway two-way regulating valve (4) automatically regulates its opening degree through an adaptive fuzzy PID controller; the adaptive fuzzy PID controller takes a temperature difference $\Delta T$ between inlet water and outlet water of the $CO_2$ gas cooler (12) and a change rate $d\Delta T/dt$ of the temperature difference as input, and utilizes a fuzzy control rule to modify PID parameters on line so as to meet a requirement of self-tuning the PID parameters; and the PID parameters are fuzzy self-tuned to find a fuzzy relation among parameters $k_P$, $k_I$, $k_D$ and $\Delta T$, $d\Delta T/dt$ of PID;

during normal heating, the opening degree $d(t_k)$ of the waterway two-way regulating valve (4) is calculated according to the following formula:

$$d(t_k) = C_1 k_P \Delta T(t_k) + C_2 k_I \sum_{i=0}^{k} \Delta T(t_i) + C_3 k_D [\Delta T(t_k) - \Delta T(t_{k-1})]$$

where k denotes a number of operations; $\Delta T$ denotes the temperature difference between the outlet water and refrigerant of the $CO_2$ gas cooler; C1-C3 denote weight coefficients; and $k_P$, $k_I$ and $k_D$ denote the PID parameters.

6. The control method of claim 4, comprising:

accurately assessing a degree of frosting of the $CO_2$ heat pump system based on measurement values of an ambient temperature sensor and an evaporation fin temperature sensor; determining that the $CO_2$ evaporator of the $CO_2$ heat pump system has been sufficiently frosted as long as following three conditions are all met, and entering a defrosting mode to defrost, wherein the following three conditions lie in that: a frosting time of a unit is greater than a setting time; a measured ambient temperature is lower than a defrosting ambient temperature setting value; and a temperature difference between the measured ambient temperature and a measured temperature of evaporation fins is greater than a defrosting temperature difference setting value; and when defrost starts, setting the opening degree of the electronic expansion valve (13) to be the maximum, opening the defrosting solenoid valve (14), closing the waterway two-way regulating valve (4), stopping a fan of the $CO_2$ evaporator (15), such that high-temperature and high-pressure gas of the outlet of the $CO_2$ compressor (11) flows through the $CO_2$ gas cooler, the two parallel electronic expansion valves (13) and the defrosting solenoid valve (14) for throttling and pressure reduction, and then enters the $CO_2$ evaporator, and fully exchanges heat with a frost layer in the $CO_2$ evaporator, so as to achieve defrosting as soon as possible.

7. The control method of claim 6, comprising:

when defrost starts, opening the waterway bypass valve (3), in such a manner that second circulating water flowing through the precooling system evaporator (24) is bypassed to the three-way confluence valve (5) through the waterway bypass valve (3) and flows out from the system water outlet to be supplied to a user.

8. The control method claim 6, comprising:

accurately assessing a defrosting effect of the $CO_2$ heat pump system based on measurement values of the evaporation fin temperature sensor and an evaporation pressure sensor; and determining that a frost layer on the $CO_2$ evaporator has been eliminated as long as one of following three conditions is met, exiting the defrosting mode, and restarting a normal heating process, wherein the following three conditions lie in that: a temperature of evaporation fins of a unit exceeds a setting defrosting ending temperature; an evaporation pressure of the unit exceeds a setting defrosting ending pressure; and an accumulated defrosting time of the unit reaches a maximum setting defrosting time; and when the defrosting mode exits, returning the opening degree of the electronic expansion valve to a memory value of a last normal operation, closing the defrosting solenoid valve, returning the opening degree of the waterway two-way regulating valve to a memory value of a last normal operation, and starting the fan of the $CO_2$ evaporator to a memory rotating speed of the last normal operation, in such a manner that an effective pressure difference is established as soon as possible in the system, and the system is recovered to a normal heating state.

9. The control method of claim 8, wherein the defrosting temperature difference setting value in the three conditions of entering the defrosting mode is calculated as follows:

where (° C.) is the defrosting temperature difference setting value $T_{air}$ (° C.) is the ambient temperature;

the maximum setting defrosting time in the three conditions of exiting the defrosting mode is calculated as follows:

$$t_{df,max} = 15 + \frac{1}{2}\text{abs}(T_{air})$$

where $t_{df,max}$ (° C.) is the maximum setting defrosting time, $T_{air}$ (° C.) is the ambient temperature, and abs $(T_{air})$ is an absolute value of the ambient temperature; and a discharge pressure during defrosting is set as:

$$\begin{cases} P_d = \frac{9}{4}P_s + \frac{1}{10}\text{abs}(T_{air}) \\ P_{d,max} = 11 \end{cases}$$

where $P_d$ (MPa) is the discharge pressure during defrosting; $P_{d,max}$ (MPa) is an upper limit of the discharge pressure during defrosting, and $P_S$ (MPa) is a suction pressure during defrosting.

10. The control method of claim 9, wherein:

in the three conditions of entering the defrosting mode, the setting time is 60 min, and the defrosting ambient temperature setting value is 0° C.; and in the three conditions of exiting the defrosting mode, the setting defrosting ending temperature is 7° C., and the setting defrosting ending pressure is 3.8 MPa.

* * * * *